(12) United States Patent
Speth

(10) Patent No.: US 10,329,159 B2
(45) Date of Patent: Jun. 25, 2019

(54) AXIAL-RADIAL FLOW CONVERTER

(71) Applicant: Haldor Topsøe A/S, Kgs. Lyngby (DK)

(72) Inventor: Christian Henrik Speth, Lynge (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/099,893

(22) PCT Filed: Jun. 9, 2017

(86) PCT No.: PCT/EP2017/064100
§ 371 (c)(1),
(2) Date: Nov. 8, 2018

(87) PCT Pub. No.: WO2017/220343
PCT Pub. Date: Dec. 28, 2017

(65) Prior Publication Data
US 2019/0152791 A1    May 23, 2019

(30) Foreign Application Priority Data

Jun. 21, 2016   (DK) .................................. 2016 00366

(51) Int. Cl.
*B01J 8/02*        (2006.01)
*B01J 19/24*       (2006.01)
*C01C 1/04*        (2006.01)
*B01J 8/04*        (2006.01)
*B01J 8/06*        (2006.01)

(52) U.S. Cl.
CPC ........... *C01C 1/0441* (2013.01); *B01J 8/0469* (2013.01); *B01J 8/0496* (2013.01); *B01J 8/067* (2013.01); *B01J 2208/00159* (2013.01); *B01J 2208/021* (2013.01); *B01J 2208/065* (2013.01)

(58) Field of Classification Search
CPC ..... C01C 1/0441; B01J 8/0469; B01J 8/0496; B01J 8/067; B01J 8/02; B01J 19/24
USPC ........................................................ 422/148
See application file for complete search history.

(56) References Cited

U.S. PATENT DOCUMENTS

| | | | |
|---|---|---|---|
| 3,784,361 A | 1/1974 | Kubec et al. | |
| 4,341,737 A | 7/1982 | Albano et al. | |
| 4,372,920 A | 2/1983 | Zardi | |
| 4,755,362 A * | 7/1988 | Zardi | B01J 8/0415 29/428 |

(Continued)

FOREIGN PATENT DOCUMENTS

| | | |
|---|---|---|
| CA | 1 200 073 A | 2/1986 |
| CN | 102755863 A | 10/2012 |

(Continued)

*Primary Examiner* — Huy Tram Nguyen
(74) *Attorney, Agent, or Firm* — Blank Rome LLP

(57) ABSTRACT

In a cooled axial/radial flow converter, in which process gas passes from an outer annulus via a catalyst bed to an inner center tube, the catalyst bed is divided into identical modules stacked on top of each other. The process gas reaches the catalyst through openings facing the outer annulus, passes axially down the catalyst bed of each module, leaves the module through collectors in the bottom thereof, and flows to the center tube. The catalyst bed is cooled by cooling panels, in which the process gas is pre-heated to the reaction temperature, while at the same time the heat of reaction is partly removed from the catalyst bed. The converter is especially suitable as ammonia converter.

4 Claims, 1 Drawing Sheet

(56) References Cited

U.S. PATENT DOCUMENTS

| | | | |
|---|---|---|---|
| 5,352,428 | A | 10/1994 | Bhakta et al. |
| 5,427,760 | A | 6/1995 | Grotz |
| 2001/0021359 | A1 | 9/2001 | Johnston |
| 2002/0102192 | A1 | 1/2002 | Kuiper et al. |
| 2003/0175196 | A1 | 9/2003 | Blackwell et al. |
| 2004/0096370 | A1 | 5/2004 | Blanchard |
| 2004/0204507 | A1 | 10/2004 | Filippi et al. |
| 2008/0014137 | A1 | 1/2008 | Barnett et al. |
| 2013/0052097 | A1* | 2/2013 | Rizzi .................... B01J 8/0214 422/200 |
| 2015/0343406 | A1 | 12/2015 | Zhang et al. |

FOREIGN PATENT DOCUMENTS

| | | |
|---|---|---|
| EP | 0 374 564 A1 | 6/1990 |
| EP | 2 070 590 A1 | 6/2009 |
| EP | 2 167 226 B1 | 3/2011 |
| EP | 2 759 338 A1 | 7/2014 |

* cited by examiner

AXIAL-RADIAL FLOW CONVERTER

BACKGROUND OF THE INVENTION

The present invention relates to a novel axial/radial flow converter, preferably—but not exclusively—for use as an ammonia converter.

Ammonia converters are complicated due to the fact that the synthesis of ammonia from nitrogen and hydrogen gas (in an approximate ratio of 1:3) is exothermic, and the reactions take place at high temperatures and pressures. Thus, interstage cooling is generally used between a series of catalyst zones to maintain kinetic and equilibrium conditions appropriate for optimum conversion efficiency. There must also be provisions made for servicing the catalyst zones, e.g. periodically removing and replacing catalyst when it loses its effectiveness.

Because ammonia converters are complicated, but also very important pieces of equipment, many efforts are made to improve their efficiency. Thus, US 2004/0096370 discloses a split-flow vertical ammonia converter, in which a fixed-bed catalyst zone is configured into two mechanically separated catalyst volumes and two gas streams operating in parallel. This design maintains the ratio of gas flow to catalyst volume so that there is no catalyst effectiveness loss. The catalyst beds and gas flow paths are configured so that the gas flow is downwards through each catalyst volume.

According to US 2008/0014137, ammonia is produced in a converter in which pseudo-isothermal conditions can be approached by convection cooling of a reaction zone by positioning at least a portion of said zone in indirect contact with a flow of hot gas, such as exhaust gas or pre-heated air.

The use of axial-radial flow reactors in synthesis processes is not novel in itself. It is e.g. disclosed in U.S. Pat. No. 5,427,760, which describes axial-radial reactors in the Braun synloop with external heat sink. In U.S. Pat. No. 4,372,920, an axial-radial reactor for use in heterogeneous synthesis is described, and U.S. Pat. No. 5,352,428 deals with high-conversion ammonia synthesis. FIG. 4 of the latter US patent is an illustration of an axial-radial flow reactor suitable for use in the apparatus and process described.

US 2002/0102192 A1 describes a catalytic reactor wherein axial-radial flow may be achieved with the consequent advantages of a reduced pressure differential, but without any "complex reactor internals". The reactor has inlet and outlet ports and a bed of particulate catalyst disposed round a central region communicating with one of the ports and presenting less resistance to flow than the catalyst particles. The central region within the catalyst bed has a height equal to at least a major part of the height of the catalyst bed, and the exterior surface of the catalyst bed less than that of the reactor, thus leaving a space between the exterior surface of the catalyst bed and the interior walls of the reactor, said space being filled with a particulate material with less resistance to flow than the catalyst particles.

In EP 2 167 226 B1, a wall system for catalytic beds of reactors for heterogeneous synthesis of chemical compounds is disclosed. The reactors are equipped with fixed catalyst beds crossed by a gaseous flow of synthesis gas, particularly with axial-radial flow. The design may resemble that of the present invention, but the canister concept is not envisaged.

A multi-bed catalytic converter with inter-bed heat exchangers, comprising a plurality of superimposed catalytic beds and a common heat exchanger, is disclosed in EP 2 759 338 A1. The design of this converter does not have much in common with the design of the axial/radial flow converter of the present invention.

Finally, US 2004/0204507 describes a cooled axial/radial flow converter comprising an annular catalyst bed and a plurality of cooling panels arranged in a radial pattern inside the catalyst bed and surrounding a central pipe. The catalyst bed and the shell of the converter forms an outer annulus through which a process gas is passed to the catalyst bed. The process gas flows in axial-radial direction through the catalyst bed and is subsequently collected in the central pipe. The axial/radial flow converter of the present invention differs from that of the US application in that the catalyst bed is divided into a number of identical modules stacked on top of each other and also in that the process gas is passed through the cooling panels to pre-heat the gas.

When low pressure drop is required in a fixed bed catalytic converter, a radial flow type converter is often selected. However, in special cases, such as cooled catalyst bed, catalyst shrinkage or catalyst particles having low strength combined with a high catalyst bed, this solution is not practical, and instead inter-bed cooling or parallel reactors must be selected.

SUMMARY OF THE INVENTION

A solution consists of replacing the radial flow bed with a stack of identical axial flow canisters. Although the flow through each individual canister is axial, the assembly can have a flow pattern as a radial flow reactor, for instance taking feed flow from an outer annulus and disposing the reactor effluent to an inner tube. The bed height can be adjusted to meet the requirement for pressure drop and catalyst strength without changing the principal layout of the reactor.

Thus, the present invention relates to a cooled axial/radial flow converter, in which process gas passes from an outer annulus via a catalyst bed to an inner centre tube, wherein
  the catalyst bed is divided into a number of identical modules stacked on top of each other,
  the feed flow of process gas reaches the catalyst through openings facing the outer annulus, passes axially down the catalyst bed of each module, leaves the module through collectors in the bottom thereof, and flows to the centre tube, and
  the catalyst bed is cooled by cooling panels, in which the process gas is pre-heated to the reaction temperature, while at the same time the heat of reaction is partly removed from the catalyst bed.

Cooling of the catalyst is possible by insertion of vertical cooling plates installed radially in each canister: Inside the panel, incoming gas is heated up to reaction temperature, at the same time removing heat of reaction from the catalyst. This principle is shown in the attached FIGURE.

DETAILED DESCRIPTION OF THE PREFERRED EMBODIMENT

Figure 1:
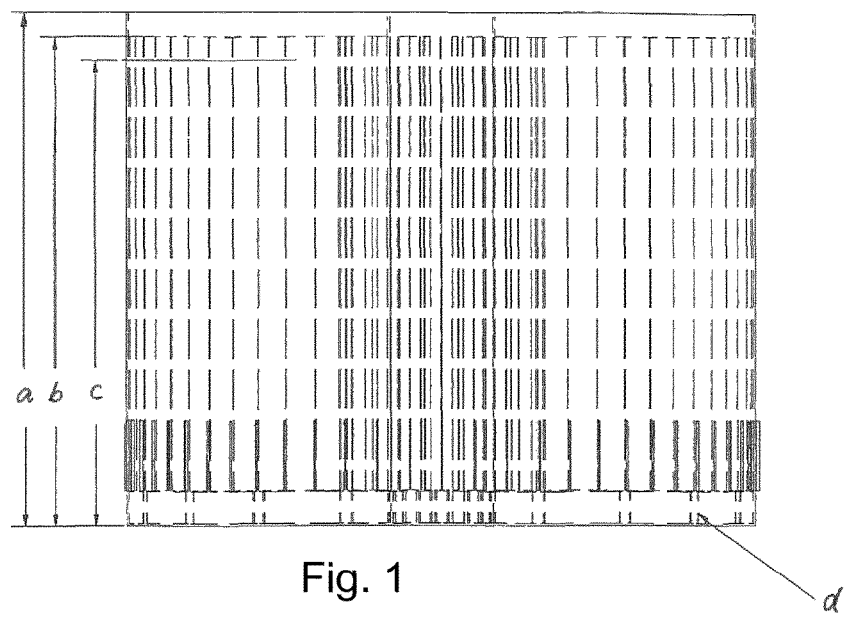
FIG. 1 is a side view.

In the side view of the canister shown in FIG. 1, a represents the total height, b is the height from the bottom to the top of the exchanger plates, and c is the catalyst height. Further, d represents the outlet profiles of the canister.

Figure 2:
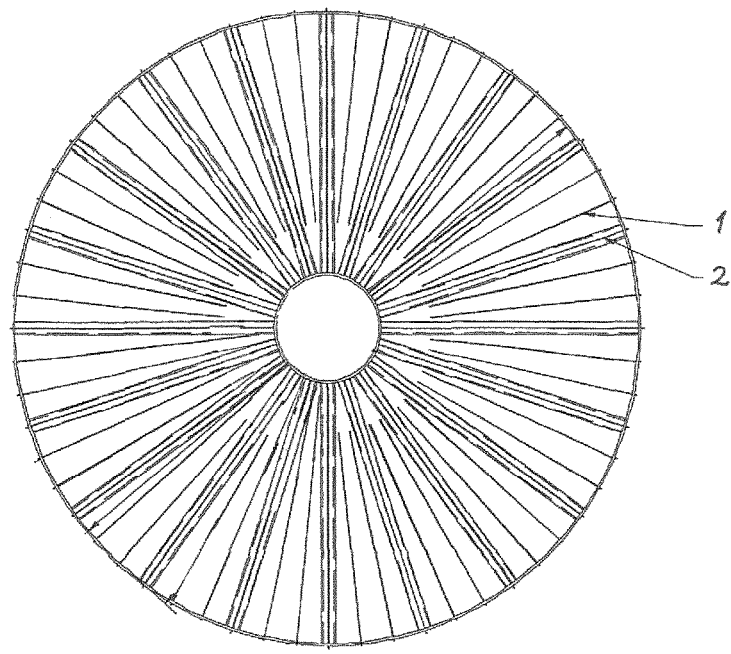
FIG. 2 is a top view, of a preferred embodiment of the canister.

In the top view of the canister shown in FIG. 2, it is seen that this embodiment of the canister comprises both a number of small exchanger plates (1) and a number of main exchanger plates (2). In this embodiment, the number of small plates is larger than that of main plates.

Alternatively, the flow pattern can be simple adiabatic, and inter-bed cooling can be provided by installing a heat exchanger in the inner chamber. In this way, several reaction steps within the same pressure shell will be possible.

The selection depends on the intended servicing.

One possible application of the novel axial/radial flow converter of the invention is to use it as an ammonia converter, as will be described in more detail below. The Haber-Bosch ammonia synthesis belongs to the "autothermic process" category, meaning that it is an exothermic chemical reaction for which the temperature is maintained by the heat of reaction alone. In order to achieve this condition, gas flow and heat exchange are arranged to reduce the increase in temperature associated with the exothermic reaction and to suppress the need for an external source of heat once the reaction is started.

Cooling of the catalyst in ammonia production is well-known from the classical TVA converter. In the catalyst section of the TVA converter, the pre-heated gas flows up inside a large number of small tubes. There it absorbs part of the heat generated by the chemical reaction on the catalyst. At the top of the converter the synthesis gas, now brought to a sufficient temperature, reverses its direction and flows down the catalyst bed where the reaction occurs. However, the TVA converter had full axial flow, resulting in a high pressure drop and the need for parallel converters to obtain high production capacities.

The axial/radial flow converter according to the invention, preferably for use as an ammonia converter, has a main flow pattern similar to that of a radial flow converter, which means that gas passes from an outer annulus via a catalyst bed to an inner centre tube. However, the flow pattern in the catalyst bed is different in that the catalyst bed is divided in a number of modules stacked on top of each other. The feed flow to each module reaches the catalyst through ports facing the outer annulus. Then it flows axially down the catalyst bed and exits the module through collectors in the bottom and flows to the centre tube where all reactants are collected.

The catalyst bed is cooled by cooling panels in which the feed gas is pre-heated to the reaction temperature while, at the same time, removing the heat of reaction from the catalyst bed.

For an ammonia converter, a number of advantages can be obtained, such as a lower pressure drop in the converter if that is desired. Further it may be possible to utilize smaller catalyst sizes, i.e. below 1.5 mm.

A higher conversion in the first bed(s) can also be obtained due to intra-bed cooling. Further there is a possibility of obtaining the same conversion in one bed as previously was obtained over the first two beds.

The bed can be loaded outside the converter. In fact, it may be loaded in the catalyst plant, then reduced, sealed and shipped and finally mounted directly in the converter shell.

The axial/radial converter of the invention is suitable for revamp purposes as well as for grassroots projects. In the latter case, however, a full diameter converter cover is required.

The idea underlying the present invention is to combine the virtues of the TVA converter and the radial flow converter, but keeping the flow pattern outside the new bed exactly the same as in Applicant's radial flow converters, also for the convenience of revamp.

The flow concept may also be used for other types of converters, for which a low pressure drop is desired or in case the catalyst shrinks during the reduction process.

The invention claimed is:

1. A cooled axial/radial flow converter, in which process gas passes from an outer annulus via a catalyst bed to an inner centre tube, wherein
    the catalyst bed is divided into a number of identical modules stacked on top of each other,
    the feed flow of process gas reaches the catalyst through openings facing the outer annulus, passes axially down the catalyst bed of each module, leaves the module through collectors in the bottom thereof, and flows to the centre tube, and
    the catalyst bed is cooled by cooling panels, in which the process gas is pre-heated to the reaction temperature, while at the same time the heat of reaction is partly removed from the catalyst bed.

2. Converter according to claim 1, which is used as an ammonia converter.

3. Converter according to claim 1, wherein the module is an axial flow canister comprising a number of small exchanger plates and a number of main exchanger plates.

4. Converter according to claim 3, wherein cooling of the catalyst is achieved by insertion of vertical cooling plates installed radially in each canister.

* * * * *